United States Patent Office 3,376,696
Patented Apr. 9, 1968

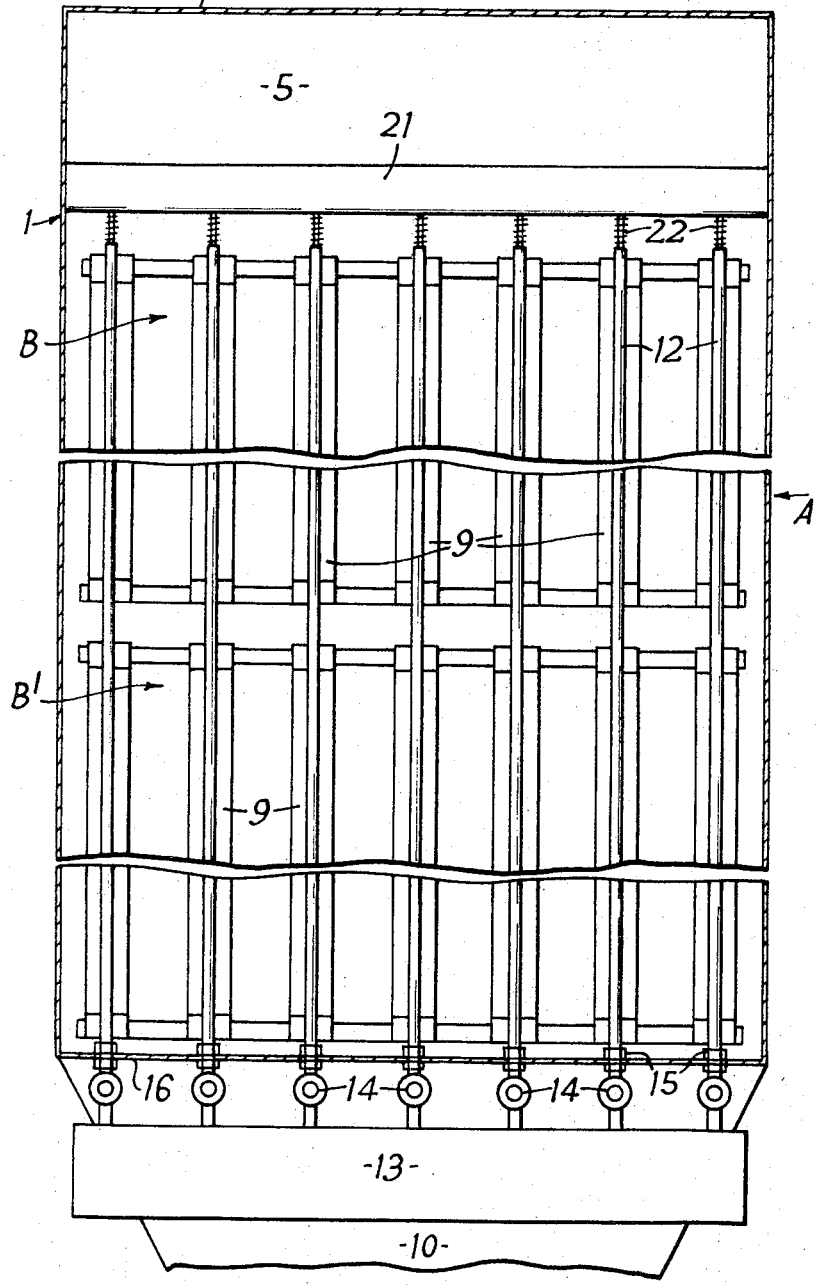

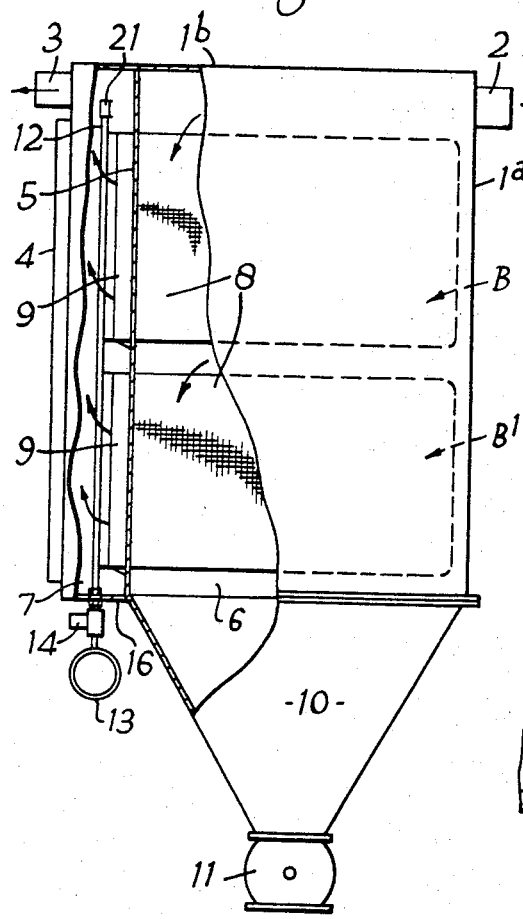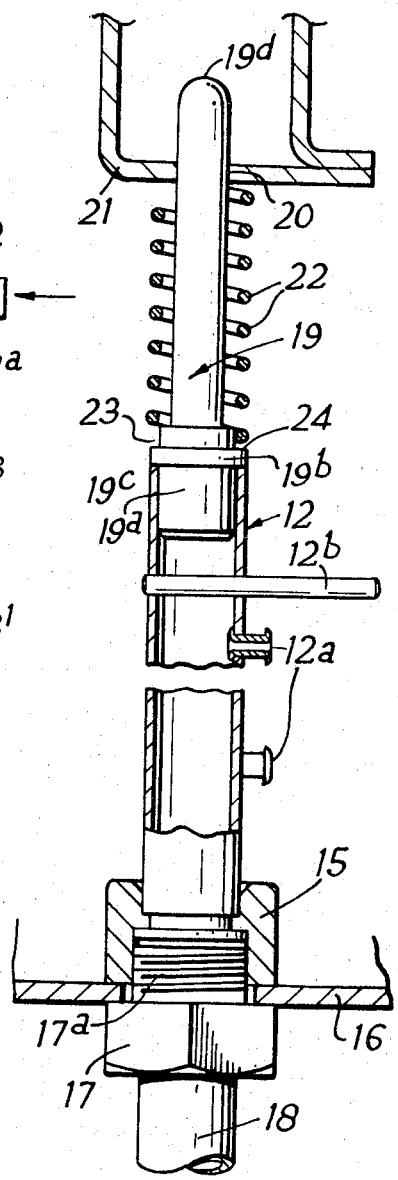

3,376,696
GAS FILTERING APPARATUS
Alfred J. Wells and Richard H. Baxendale, Leicester, England, assignors to Dust Control Equipment Limited, Leicester, England
Filed Aug. 8, 1966, Ser. No. 571,059
Claims priority, application Great Britain, Aug. 17, 1965, 35,109/65
8 Claims. (Cl. 55—302)

ABSTRACT OF THE DISCLOSURE

Gas filtering apparatus, employing a plurality of flat-sided filter pads, in which the latter are cleaned by applying bursts of high-pressure cleaning gas therethrough in the opposite direction to the normal filtering direction, these bursts coming from nozzles in jet pipes arranged co-extensively with the pad mouths. The jet pipes are each mounted at one end in gland, and at the other end are each provided with a spigot projecting into a socket, a helical compression spring carried by the spigot serving to bias the relevant end of the tube into the gland, and to make the tubes easily removable.

---

This invention relates to gas filtering apparatus of the kind comprising, in combination, a casing provided with one or more inlets for dust laden gas and at least one exhaust vent for the discharge of gas in a filtered condition, a series of flat sided filter pads which are arranged side by side in closely spaced relation within the casing, each of such pads including a flat open mouthed bag or sleeve of a permeable filtering medium and an insert of an open character which holds apart the sides of the pad to keep the latter open in use and yet permits the free passage of gas therethrough, and a jet cleaning system adapted periodically to force a cleaning gas, for example air, through the apparatus adjacent the filter pads to create a reverse flow in which the flow of filtered air is reversed through the filtering medium in order to clean the latter. Such apparatus will hereinafter be denoted apparatus of the kind concerned.

Moreover, the invention has reference particularly to gas filtering apparatus of this kind and of a previously proposed form in which the jet cleaning system functions to arrest and reverse the normal flow of gas passing through the filtering medium by an abrupt and momentary introduction to the said medium of compressed high energy gas having sufficient energy to counteract immediately the energy and pressure producing and normally maintaining the filtering flow. Such apparatus will hereinafter be denoted apparatus of the form concerned.

The invention is applicable, for example, to a gas filtering apparatus of the kind wherein each filter pad is provided with one or more tubular outlets having located within each, or on the upstream side of each, a nozzle or nozzles from which are periodically released momentary bursts of compressed cleaning gas for passage through or across the said tubular outlet into the filter pad, the position of the or each nozzle in or on the upstream side of the or each tubular outlet being such as to induce a reverse flow of the ambient filtered gas on the downstream side of the said outlet suchwise as to cause a reversal of flow through the filtering medium.

There is no limitation in this respect, however, since the present invention is equally applicable to other gas filtering apparatus of the kind and form concerned. For example, the invention is also applicable to the gas filtering apparatus described and claimed in the complete specification of our prior British Letters Patent No. 992,290 wherein a nozzle or nozzles is or are provided which are arranged to direct compressed high energy gas into the spaces between the adjacent filter pads and thus on to the outsides of the latter constituting the upstream faces of the filtering medium.

The invention is also applicable to a gas filtering apparatus of the kind wherein each filter pad has a single tubular outlet of a cross-sectional length equal or approximately so to the width of the pad, the said outlet comprising an outer portion which, except at its mouth, is substantially narrower in internal cross-sectional width than the thickness of the pad, and an inner portion of progressively increasing cross-sectional width which terminates at the inner edge of the outlet where it communicates with the interior of the pad, the said narrow outer portion of the outlet being in the nature of a constricted throat which provides a venturi effect so that a substantial volume of reversed filtered gas is induced to flow into the outlet at each jet-cleaning period.

Apparatus of the kind and form concerned are frequently used as dust collectors adapted for industrial use with any of various kinds of machines such as grinding, cutting, polishing, sanding and many others used in the engineering, chemical, food and other industries for the purpose of carrying away dust laden air from around rotary tools and other moving components of such machines.

Such apparatus are also, however, used as venting units for mounting upon receiving hoppers, mixing bins, silos or the like (which then constitute the casings of the apparatus) into which powders of any description may be conveyed pneumatically, the purpose of the unit in this case being to separate the conveying air from the material being conveyed whilst retaining the said material within the hopper, bin or silo.

Now in apparatus of the kind and form concerned the or each nozzle located in or adjacent the mouth of each filter pad (or alternatively located in or adjacent the space between an adjacent pair of filter pads, depending upon the arrangement), is mounted upon a jet tube which extends along the length of the mouth of the filter pad or along the length of the space between an adjacent pair of filter pads.

In conventional apparatus of the kind and form concerned the jet tubes are detachably mounted. Thus, in one known arrangement the jet tubes are detachably mounted upon the spaced members of a suitable framework, one end of the tube being fixed by means of a gland, nut and sleeve to a screwed body mounted in one frame member, through which the high pressure gas is supplied to the jet tube, and the opposite closed end of the tube is adapted to be supported by the opposite frame member.

The conventional arrangements suffer from certain disadvantages. Thus, the filter pads require to be periodically removed from the apparatus. Such removal is required for example, when the pads become worn and require replacement, or when alternative pads have to be used for the time being, as for example when the apparatus is used for filtering different dye stuffs, the different pads being employed exclusively for the respective dye stuffs. Manifestly, when the filter pads are removed individually from the casing, the jet tube associated with each filter pad first has to be removed. Where, as may be the case, the filter pads are mounted in a unitary assembly which has to be removed bodily from the casing, all of the jet tubes first have to be removed from their mountings. Because of the conventional manner of mounting the jet tubes this is a time consuming operation. Another disadvantage is that in the particular conventional arrangement described above, the gland nuts tend to become corroded, particularly where the apparatus is used for the filtering of moist air.

The aim of the president invention is to provide a gas filtering apparatus of the kind and form concerned in which the jet tubes are mounted in a particularly simple manner and can be readily removed, thereby facilitating easier maintenance of the apparatus.

In the gas filtering apparatus according to the invention each jet tube is such as to fit at one end into a nipple or gland on one support member and through which high pressure gas is arranged to be supplied, the opposite end of the jet tube being received in an aperture or socket formed or provided in or on another support member and means are provided for biasing the first mentioned end of the tube into the nipple or gland.

As will be appreciated the idea of the present invention is that the or each jet tube is normally positively retained in position within the apparatus by the action of the associated biasing means and not by any locking means such as nuts. Thus, all that is necessary to enable the jet tube to be removed, is to move the tube axially in a direction so as to clear the relevant end of the jet tube from the nipple or gland, which latter end of the tube can then be moved laterally so that the opposite end of the tube can be removed from the said aperture or socket and the jet tube can be completely removed.

The said biasing means may be of any appropriate form. Thus, they may be in the form of cams. Preferably, however, the said biasing means is constituted by a spring arranged to bias the tube axially in the requisite direction. Thus, a cap could be provided constituting said socket provided on the relevant support member for receiving the relevant end of the jet tube, mounted upon the said support member and being biased by said spring in the relevant direction away from the support member. Alternatively, the relevant end of the tube may be received in a fixed socket or an aperture and the spring may abut against an abutment or shoulder on the jet tube. Preferably, however, a spigot is formed or provided at the relevant end of the jet tube and which is received in the said aperture or socket and the spring is in the form of a helical compression spring which is mounted upon the spigot and is adapted to abut at one end upon the end of the jet tube or an abutment thereon, and at the opposite end to abut, either directly or through the interposition of a washer, upon the portion of the frame member defining the socket or aperture. Manifestly, the spring will be of such strength that it will positively retain the jet tube in position within the apparatus despite the considerable force created by the flow of high pressure gas but such that the action of the spring can be readily overcome by manual pressure in removing the jet tube.

In order that the invention may be more clearly understood and readily carried into practical effect, one specific constructional example thereof will now be described with reference to the accompanying drawings wherein:

FIGURE 1 is a sectional front elevation of the apparatus,

FIGURE 2 is a side levation of the apparatus looking in the direction of the arrow A in FIGURE 1, part of the casing being removed to show the interior thereof, and FIGURE 3 is a longitudinal sectional view through one of the jet tubes and adjacent parts.

Like parts are designated by similar references throughout the drawings.

Referring to FIGURES 1 and 2, it will be seen that the filtering apparatus comprises a rectangular casing 1 having an inlet 2 for dust laden gas, e.g. air, and a clean gas outlet 3. The inlet 2 is provided in the closed back 1a of the casing 1 at a location adjoining the top 1b thereof. The outlet 3 is provided in the front of the casing closely adjacent to the top 1b and above a removable or openable access door 4.

A vertical screen or slotted support structure 5 extends parallel to the front of the casing 1 immediately behind the normally closed access door 4, and divides the casing 1 into a large dust-laden-gas chamber 6 and a smaller clean-gas chamber 7.

In this example there are two superimposed series or banks B and $B^1$ of vertically disposed flat-sided filter pads 8 each having a single elongated tubular outlet 9. The mouths of the outlets 9 are located in and sealed to apertures formed in the screen or structure 5.

Each of the pads 8 includes a flat open mouthed bag or sleeve of a permeable filtering medium and an insert (not visible) of an open character which holds apart the sides of the pad to keep the latter open in use and yet permits the free passage of gas therethrough.

Disposed below the casing and comunicating with the dust-laden-gas chamber is a hopper 10 combined with the bottom of the casing 1 in which dust can be collected and from which dust can be expelled through a rotary seal 11.

The apparatus includes a jet cleaning system comprising a series of identical vertically disposed parallel jet tubes 12 each of circular shape in cross-section and having circular section bores. Each tube 12 is co-extensive with the outlets 9 of two aligned filter pads 8, one in each of the two superimposed banks B and $B^1$. The jet tubes 12 are each provided with one or more apertures or nozzles 12a directed towards the mouths of the pads and through which periodic releases of high energy gas can flow into the outlets 9 of the relevant pads to effect cleaning thereof as hereinbefore described.

Moreover, each jet tube 12 is formed or provided, adjacent to one end, with a radially extending pin 12b which is intended to abut against a part or parts, for example, against the sides of the mouth of a filter pad, to locate the tube in the requisite orientation with the nozzle or nozzles 12a correctly located with respect to the filter pad 8.

All of the jet tubes 12 are connected to a common air manifold 13, through which the compressed high energy gas is supplied. Periodic release of gas is controlled by automatically actuated solenoid valves 14.

In accordance with the characteristic feature of the present invention, as illustrated in FIGURE 3 of the drawings, the jet tube 12 is a sliding fit in, and providing a metal to metal seal with, a nipple or gland 15, mounted on a lower support member 16 of the casing 1, and through which high pressure gas is arranged to be supplied from the manifold 13.

The nipple or gland 15, is, in this example, in the form of a nut which is engaged with complementary screw threads 17a of a nut or sleeve 17 upon the end of the high pressure gas conduit 18.

In the present example the bore of the nipple or gland 15 is of constant cross-section of a size to receive the relevant end of the jet tube 12. However, in an alternative construction, the bore is tapered so as to provide a flared entrance for the end of the jet tube 12.

A spigot component 19 is provided which closes the end of the tube 12 remote from the nipple or gland 15, and is arranged to be received in an aperture 20 provided in an upper support member 21. Spigot component 19 is, in this example, of circular cross-section and comprises a short portion 19a of such a cross-section that it is a push fit into the upper end portion of the bore of the tube 12, an adjoining portion 19b of somewhat larger cross-section forming an annular flange providing an annular shoulder 19c which is adapted to abut against the end of the tube 12 and locate the component 19, and a spigot portion 19d which is, in this example, but which need not necessarily be, of smaller cross-section than the first portion 19a. This component may be of any suitabl material. Thus, it may be of mild steel. Preferably, however, it is of nylon or other plastics material.

A helical compression spring 22 is mounted on the spigot 19d of the spigot component 19 for biasing the lower end of the tube 12 into the nipple or gland 15. This spring 22 has an internal diameter which is somewhat greater than the diameter of the spigot 19d of the spigot component so that there is an annular space between the spigot and the spring. Where required, however, the spring 22 could be a close sliding fit on the portion 19d of the component 19.

In order to locate the spring relatively to the portion 19d of the spigot component 19 the relevant side of the portion 19b of the component 19 forming an annular flange is formed with an annular rebate 23 providing an annular shoulder 24 of a diameter to receive and locate the relevant end of the spring 22. Moreover, in an embodiment, which is not illustrated, a washer is provided between the compression spring 22 and the relevant support member for receiving the spigot. This washer may be formed at one side with an axially extending flange providing an annular shoulder of a diameter to receive and locate the relevant end of the spring which can be received within the spring at one end thereof. Although the washer, where provided, could be of any suitable material it is preferably of nylon or any other suitable non-corrosive material.

In any event, the idea is that the tubes 12 are normally positively retained in position by the action of the spring 20 or, in an alternative arrangement, not illustrated, by a cam and not by any locking means, such as nuts, but when the filter pads 8 are to be removed from the apparatus, for example, when they become worn and require replacement, or when alternative pads have to be used, the access door 4 is opened or removed from the apparatus and the jet tubes 12 are grasped in turn by the operative and moved axially upwards against the force of the compression spring 22, thereby releasing the lower end from the relevant nipple or gland 15. The lower end of the tube is then pulled outwards and then downwards so as to clear the nipple or gland 15 and pull the spigot 20 from within the aperture 21.

With the jet tubes 12 removed, access may be gained to the pads 8 for removal and replacement thereof. The tubes 12 are then replaced by the reverse procedure to that described for their removal.

It is to be noted that in an alternative embodiment in which the spigot 19 is omitted, the end of the tube received in the socket or aperture in the support member 21 will essentially be closed to ensure that gas issues through the nozzles or apertures of the jet tubes 12.

We claim:

1. A gas filtering apparatus comprising, in combination, a casing, said casing being divided into a dust-laden-gas chamber and a clean gas chamber, at least one inlet for dust-laden gas being provided in the wall of the dust-laden-gase chamber and at least one outlet for clean gas being provided in the wall of the clean air chamber; a partition in said casing; a plurality of flat sided gas permeable filter pads disposed in side-by-side relationship within said casing, each pad including a flat bag of permeable filtering material, each said bag having an open-mouth formed therein and each sead mouth being tubular in shape and having a longitudinal axis, each said mouth being located in and sealed to respective apertures in said partition, wherein the said partition and the said bags divide the interiod of the casing into the said dust-laden-gas chamber and the said clean gas chamber; each said mouth having a shortest dimension and a longest dimension extending in a plane substantially perpendicular to the said longitudinal axis, said longest dimensions being substantially parallel with each other, a plurality of jet tubes, one located at and operatively associated with each said mouth, each said jet tube extending substantially parallel to and being at least as long as the said longest dimension of its respective associated mouth, a series of nozzles spaced longitudinally along each said jet tube and directed towards its respective associated open mouth, a spigot provided at one end of each said jet tube, a first support member within said casing and having a plurality of sockets formed therein and extending transversely across the casing and substantially parallel to the smallest dimension of the mouths at one end of said longest dimension of said mouths, a second support member extending substantially parallel to the first support member and located at the other end of the said longest dimension of said mouths, each spigot having one of said sockets operatively associated therewith, each said socket receiving a respective spigot, the second support member including a plurality of openings, each said jet tube being operatively associated with a respective one of said openings, a plurality of hollow glands, each gland having a bore and being in the form of a nut, one gland disposed at each said opening of the second support member and receiving a respective one of said other ends of said jet tube; each said spigot having a helical compression spring mounted on a spring mounting portion thereof and each spring exerting a force against a respective jet tube and the first support member and urging the relevant end of said respective jet tube into a respective one of said glands; a manifold for receiving compressed air from an external source and delivering the same to each of said jet tubes, a separate conduit connecting each jet tube to the said manifold, each said conduit having an end portion passing through a respective one of said openings in said second support member and positively connected to its respective gland and holding the gland tightly to the said second support member.

2. A gas filtering apparatus according to claim 1 wherein each said spigot comprises a first portion which is of a cross-section such that it is a push fit into the end of the jet tube closest to the first support member, and an adjoining second spigot portion of somewhat larger cross-section forming an annular flange providing an annular shoulder which is adapted to abut against the end of said jet tube, and a further third spigot portion of smaller cross-section than the first portion and adapted to extend through its respective socket in the first support member.

3. A gas filtering apparatus according to claim 2 wherein each spigot includes a fourth spigot portion between the second and third spigot portions, and third spigot portion being the said spring mounting portion and having an annular shoulder of a diameter to receive and locate the relevant end of said spring.

4. A gas filtering appartus as claimed in claim 3 wherein each said jet tube is of circular cross-section with a circular bore and each said spigot is of circular cross-section and the bore of each said gland has a portion of constant circular cross-section and of a diameter to receive the end of a respective one of said tubes which end is closest to the second support member, and wherein each said jet tube includes, at a point adjacent to its respective associated open mouth, a radially extending pin which is intended to abut against the mouth of the respective filter pad to locate the jet tube in the requisite orientation with the nozzle or nozzles correctly located with respect to the respective filter pad, and wherein each said gland includes internal threads, each said conduit includes external threads and wherein the respective ones of said internal and external threads are engaged with each other to hold each gland tightly against the second support member.

5. A gas filtering apparatus as claimed in claim 4 including a hopper disposed below the casing and in communication with the dust-laden-gas chamber for receiving dust removed from the filter pads; and a seal controlling the outlet of said hopper.

6. A gas filtering apparatus according to claim 1 wherein each jet tube is of a circular cross-section with a circular bore and each said spigot is of circular cross-section and the bore of each said gland has a portion of constant diameter to receive the end of a respective one of said jet tubes closest to the second support member.

7. A gas filtering apparatus according to claim 1 wherein each said jet tube includes, at one point adajcent its respective associated open mouth, a pin extending radially of said tube and positioned to abut against the mouth of a respective filter pad to locate the tube in the requisite orientation with the nozzle or nozzles correctly located with respect to the respective filter pad.

8. A gas filtering apparatus according to claim 1 wherein each of said glands includes internal screw threads and wherein each of said conduits includes external screw threads at the portion thereof which extends through the opening in the second support member, and wherein the external threads of the conduit engage the internal threads of the respective gland to urge the gland tightly against the second support member.

References Cited

UNITED STATES PATENTS

| | | | |
|---|---|---|---|
| 1,507,909 | 9/1924 | Davis | 239—283 |
| 2,275,958 | 3/1942 | Hagel | 210—411 X |
| 2,297,966 | 10/1942 | Luff | 285—399 X |
| 2,346,278 | 4/1944 | Stewart et al. | 239—282 |
| 2,484,192 | 10/1949 | Squiller | 285—399 X |
| 2,631,061 | 3/1953 | Nelson | 239—276 X |
| 2,735,699 | 2/1956 | Chadbourne | 285—399 X |
| 2,861,649 | 11/1958 | Junkmann | 55—294 |
| 3,061,102 | 10/1962 | Mayer, Jr. | 210—412 X |
| 3,151,822 | 10/1964 | Glaner | 239—274 X |
| 3,157,370 | 11/1964 | Govatsos et al. | |
| 3,233,882 | 2/1966 | Calaceto | 261—118 |

FOREIGN PATENTS

| | | |
|---|---|---|
| 798,267 | 7/1958 | Great Britain. |
| 990,587 | 4/1965 | Great Britain. |
| 1,016,556 | 1/1966 | Great Britain. |

HARRY B. THORNTON, *Primary Examiner.*

D. TALBERT, *Assistant Examiner.*